United States Patent
Welchko et al.

(10) Patent No.: US 8,634,976 B2
(45) Date of Patent: Jan. 21, 2014

(54) SYSTEMS AND METHODS FOR MANAGING TORQUE CAPABILITY IN ELECTRIC MOTOR SYSTEMS

(75) Inventors: Brian A. Welchko, Torrance, CA (US); Nitinkumar R. Patel, Cypress, CA (US); Leah Dunbar, Manhattan Beach, CA (US); William R. Cawthorne, Milford, MI (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 574 days.

(21) Appl. No.: 12/715,081

(22) Filed: Mar. 1, 2010

(65) Prior Publication Data

US 2011/0213518 A1 Sep. 1, 2011

(51) Int. Cl.
*B60L 9/00* (2006.01)

(52) U.S. Cl.
USPC .............. 701/22; 701/54; 180/66.225; 477/3; 318/432; 318/472; 318/634; 307/10.1

(58) Field of Classification Search
USPC .......... 180/177, 178, 202, 6.5, 53.5, 60, 65.1, 180/65.21, 65.24, 65.225; 318/434, 473, 5, 318/432, 472, 634; 701/22, 3, 4.4, 84, 54; 477/3; 123/305; 307/10.1
See application file for complete search history.

(56) References Cited

U.S. PATENT DOCUMENTS

| | | | | |
|---|---|---|---|---|
| 6,116,210 A | * | 9/2000 | Oder et al. ..................... | 123/305 |
| 6,684,970 B2 | * | 2/2004 | Gotou ...................... | 180/65.225 |
| 7,302,320 B2 | * | 11/2007 | Nasr et al. ....................... | 701/22 |
| 8,112,192 B2 | * | 2/2012 | Heap et al. ...................... | 701/22 |
| 2003/0193305 A1 | * | 10/2003 | Crowley ........................ | 318/432 |
| 2005/0256623 A1 | * | 11/2005 | Hubbard et al. ................ | 701/54 |
| 2008/0001558 A1 | * | 1/2008 | Kikuchi et al. ................... | 318/5 |
| 2008/0303475 A1 | * | 12/2008 | Patel et al. ..................... | 318/634 |
| 2009/0088294 A1 | * | 4/2009 | West et al. ....................... | 477/98 |
| 2009/0115351 A1 | * | 5/2009 | Heap et al. ......................... | 318/8 |
| 2011/0021310 A1 | * | 1/2011 | Kresse et al. ...................... | 477/3 |
| 2011/0125352 A1 | * | 5/2011 | McGrogan et al. ............. | 701/22 |
| 2011/0213518 A1 | * | 9/2011 | Welchko et al. ................ | 701/22 |

OTHER PUBLICATIONS

China Patent & Trademark Office, Office Action in Chinese Patent Application No. 201110048572.3, mailed Jun. 3, 2013.

* cited by examiner

*Primary Examiner* — Tuan C. To
*Assistant Examiner* — Yuri Kan
(74) *Attorney, Agent, or Firm* — Ingrassia Fisher & Lorenz, P.C.

(57) ABSTRACT

A method for operating an electric motor is provided. The method includes receiving a torque request; determining long term torque capabilities and short term torque capabilities of the electric motor; generating a torque command based on the torque request and at least one of the long term torque capabilities or the short term torque capabilities; and controlling the electric motor in accordance with the torque command.

19 Claims, 3 Drawing Sheets

SYSTEMS AND METHODS FOR MANAGING TORQUE CAPABILITY IN ELECTRIC MOTOR SYSTEMS

TECHNICAL FIELD

The present invention generally relates to electric drive systems, and more particularly relates to systems and methods for managing torque capability in electric motors of electric and hybrid vehicles.

BACKGROUND OF THE INVENTION

Advances in technology have led to substantial changes in the design of automobiles, particularly with respect to alternative fuel vehicles, such as hybrid, electric, and fuel cell vehicles. Such vehicles may use an electric drive system in which an electric motor is powered by a battery to produce torque for a drive shaft. An electronic control system controls the operation of the electric motor by evaluating the torque requirements needed for operating the vehicle and generating a torque command for driving the vehicle.

During operation, the electric drive system may generate heat, which is usually dependent on the amount of torque generated by the electric drive system. If not properly considered, excess heat may result in undesirable issues. As such, torque commands are conventionally limited by predetermined torque capabilities of the electric motor that are based on the voltage level of the battery and other operating characteristics. These torque capabilities are generated by considering the long term impact of the torque on the vehicle, generally according to the expected life of the vehicle. Since the torque capacities function as a limit the torque command, selection of the torque capacities also impacts the performance of the vehicle. In general, designers are continually attempting to increase the performance of the vehicle without adversely impacting the electric drive system or substantially adding to the complexity and power usage.

Accordingly, it is desirable to improve performance of the electric drive system without substantially increasing processing complexity and power usage. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, a method for operating an electric motor is provided. The method includes receiving a torque request; determining long term torque capabilities and short term torque capabilities of the electric motor; generating a torque command based on the torque request and at least one of the long term torque capabilities or the short term torque capabilities; and controlling the electric motor in accordance with the torque command.

In accordance with another exemplary embodiment, an electronic control system is provided to operate an electric motor. The system includes a torque controller configured to determine long term torque capabilities and short term torque capabilities associated with the electric motor; a vehicle controller coupled to the torque controller and configured to receive a torque request and to generate a torque command based on the torque request and at least one of the long term torque capabilities or the short term torque capabilities; and an inverter module coupled to the vehicle controller and configured to receive the torque command and to drive the electric motor according to the torque command.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-4 are merely illustrative and may not be drawn to scale.

Broadly, FIGS. 1-4 illustrate systems and methods for managing torque capability in an electric drive system. The electric drive system includes an inverter module, electric motor, and battery. The electric motor is driven by the inverter module in accordance with a torque command to produce torque for propelling the automobile or regenerating the battery. In particular, exemplary systems and methods use both short and long term torque capabilities for limiting the torque command. In some situations, the short term torque capabilities result in higher torque command limits, and thus, increased torque outputs for improved performance of the automobile.

Figure 1:
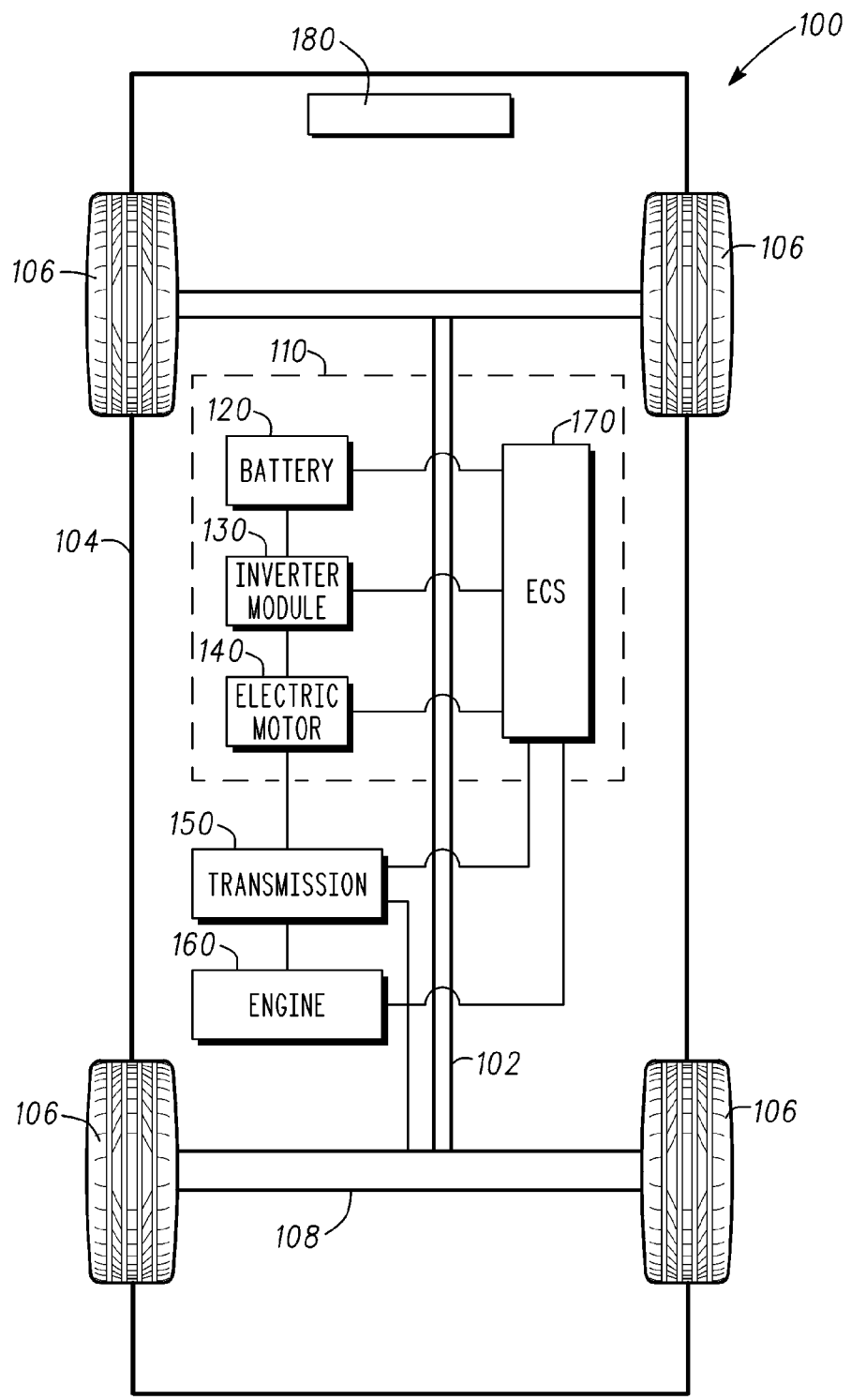
FIG. 1 is a block diagram of a vehicle according to an exemplary embodiment.

FIG. 1 is a block diagram of a vehicle 100 according to one exemplary embodiment of the present invention. The vehicle 100 may be any type of vehicle, including an automobile, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In general, the vehicle 100 may also incorporate any one of, or combination of, a number of different types of propulsion systems, such as, for example, a gasoline or diesel fueled combustion system, a "flex fuel vehicle" (FFV) system (i.e., using a mixture of gasoline and alcohol), a gaseous compound (e.g., hydrogen and/or natural gas) fueled engine system, fuel cell energy source system, combustion/electric motor hybrid engine system, and electric vehicle system.

The vehicle 100 includes a frame 102, a body 104, and a number of wheels 106. The body 104 is arranged on the frame 102 and substantially encloses the other components of the vehicle 100. The wheels 106 are each rotationally coupled to the frame 102 near a respective corner of the body 104.

In the exemplary embodiment illustrated in FIG. 1, the vehicle 100 is a hybrid vehicle with a powertrain that includes an electric drive system 110, a transmission assembly 150, and a combustion engine 160. The electric drive system 110 includes a battery 120 or other type of energy storage device, an inverter module 130, electric motor 140, and electronic control system 170. The combustion engine 160 and the electric motor 140 are configured such that both are mechanically coupled via the transmission assembly 150 to at least some of the wheels 106 through one or more drive shafts 108.

The electric motor 140 is, in one embodiment, a sinusoidally-wound alternating current (AC) motor (e.g., permanent magnet or induction). As will be appreciated by one skilled in the art, the electric motor 140 includes a stator assembly (including conductive coils) and a rotor assembly (including a ferromagnetic core). The inverter module 130 includes a three-phase circuit coupled to the electric motor 140 and the battery 120. More specifically, the inverter module 130 includes a switch network having three pairs of series switches with antiparallel diodes corresponding to the phases of the electric motor 140. The inverter module 130 converts DC power into AC power by repeatedly switching the switches contained therein.

During operation, the vehicle 100 is operated by providing power to the wheels 106 with the combustion engine 160 and the electric motor 140 in an alternating manner and/or with the combustion engine 160 and electric motor 140 simultaneously. In particular, the electric motor 140 may operate in a motoring mode or a generating mode, depending on whether the electric motor 140 is being used to propel the vehicle 100 or charge the battery 120. As such, in the motoring mode, the battery 120 supplies DC electric power to the inverter module 130. The inverter module 130 converts the DC electric power to AC electric power. This AC power is used to drive the electric motor 140 and, subsequently, transmission assembly 150, drive shaft 108, and wheels 106. In the generation mode, the electric motor 140 receives rotational energy from transmission assembly 150 and converts the energy to AC electrical power. This AC electrical power is transferred from the electric motor 140 to the inverter module 130 and is, thereby, converted to DC electrical power. This DC electrical power is used to charge the battery 120.

A cooling system 180 may also be provided to cool the various components of the vehicle 100. Although not illustrated in detail, the cooling system 180 may include multiple cooling channels therethrough that contain a cooling fluid such as oil, water and/or ethylene glycol (i.e., "antifreeze"). In one exemplary embodiment, the cooling system 180 may include a common circuit in which cooling fluid removes heat from at least the electric motor 140 and the inverter module 130. In other embodiments, the cooling system 180 may include a number of separate circuits, such as a first circuit that cools the electric motor 140 and a second circuit that cools the inverter module 130. In further embodiments, the cooling system 180 may include mechanisms for directing cooling air over the component to be cooled.

As will be discussed in greater detail below, the electronic control system 170 controls the operation of the battery 120, inverter module 130, and electric motor 140. Although not shown in detail in FIG. 1, the electronic control system 170 includes various sensors and automotive control modules, or electronic control units (ECUs), and at least one processor and/or a memory which includes instructions stored thereon (or in another computer-readable medium) for carrying out the processes and methods as described below.

Figure 2:
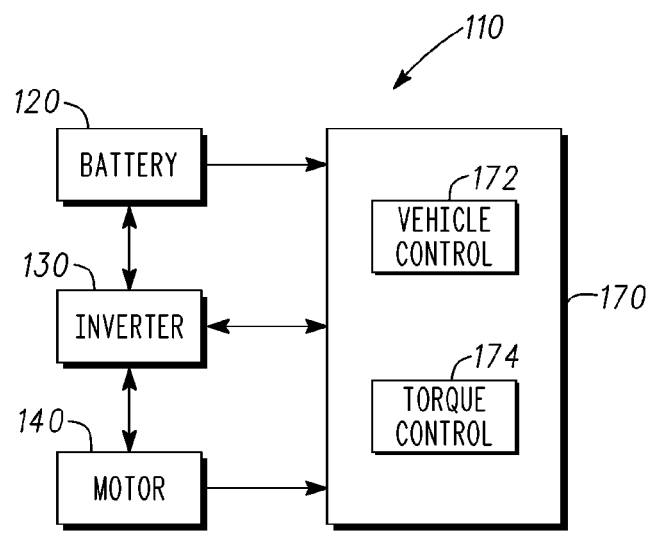
FIG. 2 is a block diagram of an electric drive system of the vehicle of FIG. 1 according to an exemplary embodiment.

FIG. 2 is a block diagram of the electric drive system 110 of the vehicle 100 of FIG. 1 according to an exemplary embodiment. As noted above, the electric drive system 110 includes the electronic control system 170, the battery 120, the inverter module 130, and the electric motor 140. The electronic control system 170 further includes a vehicle controller 172 and torque controller 174. Although FIG. 2 illustrates the vehicle controller 172 and torque controller 174 as being integral with the electronic control system 170, the vehicle controller 172 and torque controller 174 may be separate from the electronic control system 170. Moreover, FIG. 2 illustrates the vehicle controller 172 and torque controller 174 as separate controllers, although in other embodiments, the vehicle controller 172 and torque controller 174 may be integrated with one another. In one exemplary embodiment, the vehicle controller 172 and torque controller 174 may be embodied as a portion of an algorithm or a processing module. As such, one or more of the components of the vehicle controller 172 and torque controller 174 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof.

As also discussed in greater detail below, during operation, the torque controller 174 generally determines torque capabilities associated with the electric motor 140 and provides the torque capacities to the vehicle controller 172. The vehicle controller 172 may also receive a torque request based, for example, on driver input and generate a torque command based on the torque request and the torque capabilities provided by the torque controller 174. The torque command represents the torque contribution from the electric motor 140 to meet desired operation requirements. In effect, the torque capabilities serve to limit the torque command when the torque request is greater than the capacity of the electric motor 140. The torque command is then used to drive the inverter module 130 to control the electric motor 140. The electric motor 140 produces a positive or negative output torque based on the commanded torque, which may be respectively used to propel the vehicle 100 (FIG. 1) or charge the battery 120. Further details of the torque controller 174 and the vehicle controller 172 will now be described.

Figure 3:
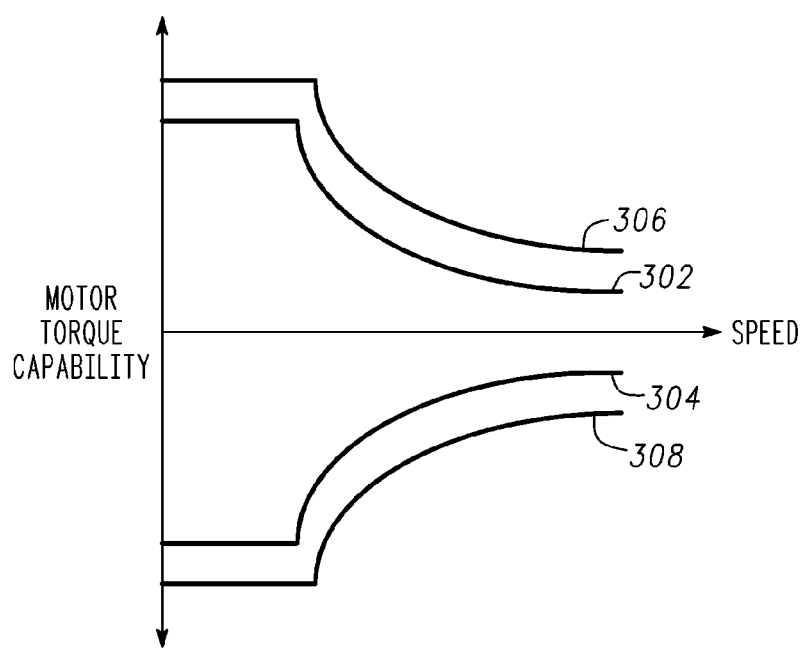
FIG. 3 is an chart illustrating exemplary torque capabilities for the electric drive system of FIG. 2.

As noted above, the torque controller 174 may generate torque capabilities. An exemplary set of torque capabilities is illustrated in FIG. 3, which illustrates exemplary relationships between motor torque capability and motor speeds. The may be referred to as capability curves that limit torque over a range of speeds and each set of torque capabilities may be initially selected from a number of torque capability curves stored, for example, in a look-up table according to a DC voltage link, as discussed below.

In accordance with an exemplary embodiment, each set of torque capabilities produced by the torque controller may include maximum and minimum long and short term torque capabilities. The minimum torque capabilities (e.g., curves 304, 308) refer to a negative torque output during the generation mode, and the maximum torque capabilities (e.g., curves 302, 306) refer to a positive torque output during the motoring mode. The long term torque capabilities (e.g., curves 302, 304) may correspond to acceptable torque capabilities for the life span of the vehicle 100 (FIG. 1). In effect, these are the torques in which the vehicle 100 (FIG. 1) may safely operate over 150,000 miles, as one example. The maximum and minimum short term torque capabilities (e.g., curves 306, 308) correspond to acceptable instantaneous torque capacities, i.e., torque capabilities that generally will not cause issues for the electric drive system 110 except for prolonged periods. As shown in FIG. 3 and as would be expected, the short term torque capabilities are greater (as an absolute value) than the long term torque capabilities since what may be acceptable for a short period of time is not suitable for extended use. In general, conventional electronic control systems only use long term torque capabilities to calculate torque commands for the inverter module.

Returning to FIG. 2, the torque controller 174 may generate the long term and short term torque capabilities (e.g., the set of curves 302, 304, 306, 308) based on a number of factors. Initially, the torque controller 174 generates nominal torque capabilities based on the DC link voltage of the battery 120. In one exemplary embodiment, it is assumed that the battery 120 does not have any present power limitations, although the torque capabilities may be adjusted based on any issues with the battery 120.

The torque controller 174 may then adjust the nominal torque capabilities based on temperature reduction factors. In particular, the torque controller 174 may receive temperature information associated the inverter module 130 and electric motor 140 and adjust the nominal torque capabilities based on this temperature information. The temperature information may be generated by temperature sensors in the inverter module 130 and electric motor 140. In general, elevated temperatures may reduce torque capabilities of the electric drive system 110 since temperatures may continue to rise in high torque applications, and increased temperatures may ultimately negatively affect the vehicle components. For example, if the temperature of the inverter module 130 and/or electric motor 140 is elevated, the nominal torque capabilities may be restricted or reduced. As used herein, "reducing" or "restricting" torque capacities refers reducing or restricting the range of torque capabilities, i.e., decreasing the maximum torque capabilities and/or increasing the minimum torque capabilities.

The torque controller 174 may also adjust the nominal torque capabilities based on cooling system reduction factors. In particular, the torque controller 174 may receive information associated the cooling system (e.g., cooling system 180 of FIG. 1) at the inverter module 130 and electric motor 140 and adjust the nominal torque capabilities based on this cooling system information. The cooling system information may be, for example, a volume of coolant and/or a temperature of the coolant and may provide additional temperature characteristics of the inverter module 130 and the electric motor 140. The cooling information may be generated by sensors associated with the cooling system 180 at the inverter module 130 and electric motor 140. If the effectiveness of the cooling system 180 is compromised, the nominal torque capabilities may be restricted or reduced. As such, the cooling system and temperature based reduction factors function to protect the electric motor 140 and inverter module 130 from undesirable temperature-related issues.

For both the temperature and cooling system reduction factors, the torque controller 174 applies the reduction factors to the long term capabilities and the short term capabilities separately. In other words, the reduction factors may have a different impact on the long term capabilities as compared to the short term capabilities. As discussed in greater detail below, this provides the vehicle controller 172 additionally flexibility in determining the torque command. In one exemplary embodiment, the independent temperature reduction factors may be used by the vehicle controller 172 to comprehend the present and near future operating capabilities of the torque controller 174. For example, if the temperatures associated with the reduction factors are elevated beyond the long term set points, the long term capabilities may be derated (possibly even to zero capability) via the reduction factors while the short term reduction factors have not yet reduced the short term capabilities. With this information, the vehicle controller 172 may take advantage of the short term capability to, for example, shift the transmission to a more favorable gear to reduce the burden on the thermally stressed systems. Independent cooling reduction factors may provide flexibility to accommodate independent cooling systems of the motor 140 and inverter module 130. Independent cooling information for the electric motor 140 and the inverter module 130 further allows for increased performance information when the cooling function is not evenly distributed. Such instances may occur if the cooling supplies are different from the nominal conditions or heat generation in the electric motor 140 and/or inverter module 130 is not evenly distributed. Uneven heat generation may occur during operation at very low output speeds and may induce localized temperature issues that impact the overall capacity of inverter module 130 and/or electric motor 140. In other embodiments, additional reduction factors may be employed to indicate if the system is in a normal operating mode and torque capacity is available or if no torque capacity is available due to fault somewhere in the system.

After these reduction factors are applied to the nominal torque capabilities, the torque controller 174 provides the resulting torque capabilities to the vehicle controller 172. By communicating both the long term torque capabilities and short term capabilities to the vehicle controller 172, the vehicle controller 172 may be able to satisfy its multiple, and often conflicting, objects that would otherwise result from communicating just a singe capability or just the long term torque capabilities or short term capabilities. The torque controller 174 may also provide the temperature and cooling system reduction factors to the vehicle controller 172 or other system controller for consideration. For example, the reduction factors may initiate a warning to the driver and/or a vehicle shut down in an extreme situation.

As discussed above, in addition to the torque capabilities, the vehicle controller 172 determines the amount of torque requested of the electric motor 140, which may be provided to the vehicle controller 172 as a single input or as a number of inputs that are then considered by the input to arrive at the torque request. In general, this torque request may depend on a number of inputs, including, for example, commands from the driver of the vehicle 100 (i.e. via an accelerator pedal or brake pedal) to increase or decrease speed. The torque request may also be dependent upon the transmission position as well as vehicle dynamic conditions, such as acceleration rate or deceleration rate, and operational conditions, such as temperatures, voltages, currents and speeds.

The vehicle controller 172 then provides the torque command based on the long and short term torque capabilities and the torque request. In particular, the vehicle controller 172 evaluates the torque request, the short term capabilities, and the long term capabilities and determines the torque command based on a number of considerations. If the torque request is less than the long term capabilities, the vehicle controller 172 may provide the torque request as the torque command. However, if the torque request exceeds the long term capabilities, the vehicle controller evaluates the impact of such a torque command and considers mechanisms for accommodating the torque request that is in excess of the long term torque capabilities. For example, the vehicle controller 172 may operate the electric motor 140 in a "performance mode" that sacrifices some of the smoothness or comfort of the vehicle 100 in exchange for fulfilling the torque request. This may be accomplished, for example, with alternative control algorithms and may be used to distinguish a hybrid system which is used in a luxury car or a sports car application. In one exemplary embodiment, the short term limit encompasses an operation region which the vehicle controller 172 uses only infrequently in order to meet the performance objectives of the vehicle while staying within the long term limits the vast majority of the time. Such a condition may occur, for example, moving a fully loaded vehicle in reverse up a steep grade. Other considerations may be based on the perceived intent of the driver. For example, if the vehicle controller 172 determines (e.g., from the throttle position) that the driver is adamant about achieving the torque request, the vehicle controller 172 may enable such a torque command for a limited period of time. Other actions provided by the vehicle controller 172 in response to the torque command in excess of the long term capabilities include readiness for future action, if the higher torque request persists, such as for example, an anticipated gear change.

In effect, the torque commands based on the short term torque capabilities enable increased performance with respect to power and speed than would otherwise be possible with the long term torque capabilities. In the short term, this situation may cause the temperature of the electric drive system 110 to increase. However, in this situation, the torque controller 174 will continue to reduce the long and short term capabilities based on the reduction factors discussed above to avoid undue impact to the electric drive system 110.

Accordingly, the electronic control system 170 enables increased performance by using the short term torque capabilities to limit the torque command instead of long term torque capabilities in certain situations. Additionally, since the nominal short term capabilities may be reduced by temperature and cooling information, the electric motor 140 may be protected from damage, even at the higher torque capabilities of short term.

Figure 4:
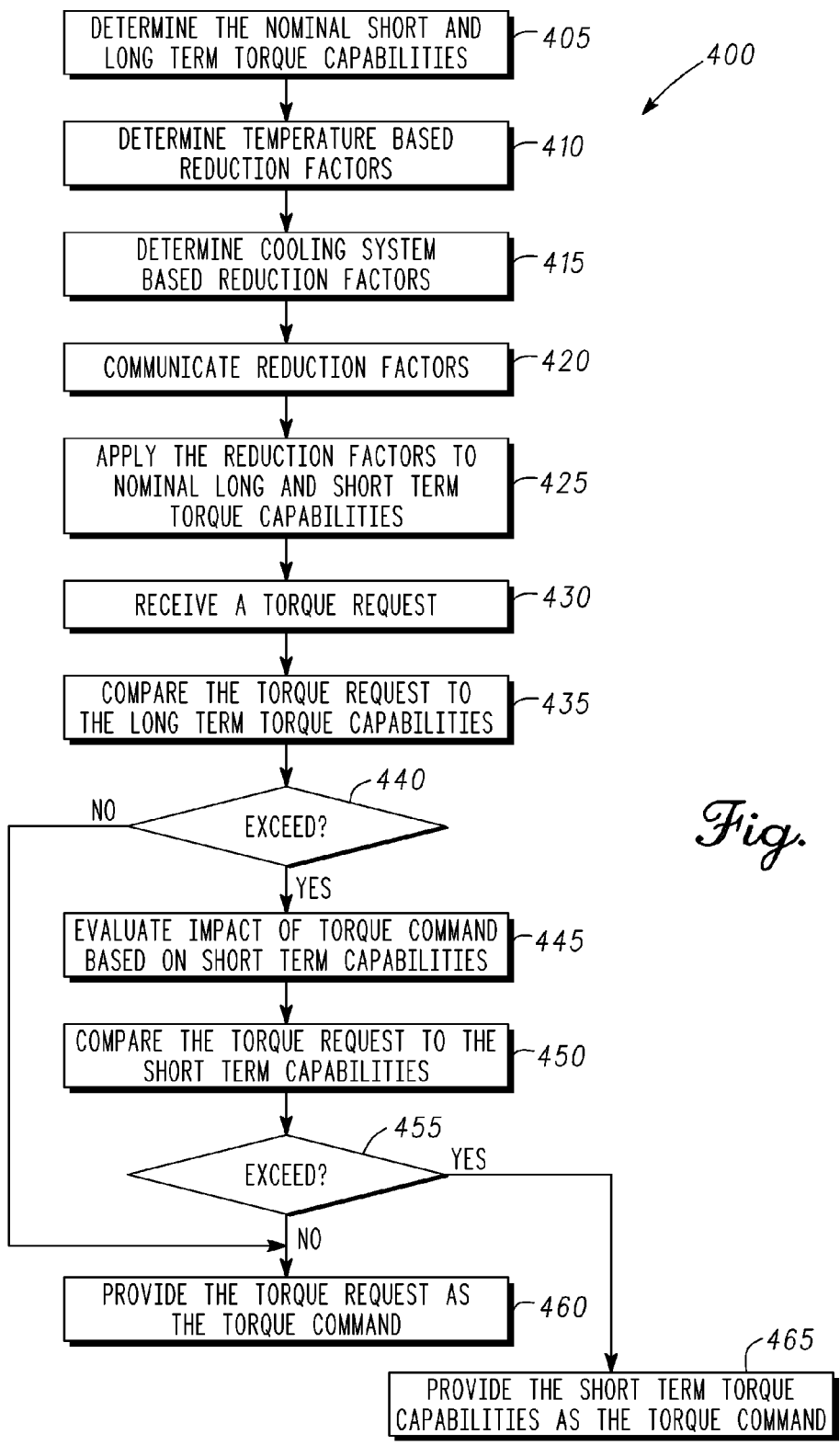
FIG. 4 is a flowchart of a method for managing the torque capabilities of an electric drive system according to an exemplary embodiment.

FIG. 4 is a flowchart of a method 400 for managing torque capabilities of an electric drive system according to an exemplary embodiment. The electric drive system implementing the method 400 may be, for example, the electric drive system 110 discussed above with reference to FIGS. 1 and 2. As such, the description below will reference FIGS. 1 and 2 when discussing the method of FIG. 4.

In a first step 405, the electronic control system 170 determines the nominal torque capability associated the electric motor 140 based, for example, on the DC link voltage of the battery 120. In a second step 410, the electronic control system 170 determines temperature based reduction factors, for example, based on temperature information from the electric motor 140 and inverter module 130. In a third step 415, the electronic control system 170 determines cooling system based reduction factors, for example, based on cooling information from the electric motor 140 and inverter module 130. In a fourth step 420, the electronic control system 170 may communicate these reduction factors to other controllers for consideration.

In a fifth step 425, the electronic control system 170 may apply the reduction factors to reduce the nominal long and short term torque capabilities to produce modified long and short term torque capabilities. In a sixth step 430, the electronic control system 170 receives a torque request, for example, based on user input.

As shown in steps 435 and 440, the electronic control system 170 compares the torque request to the long term torque capabilities. If the absolute value of the torque request is less than the absolute value of the long term torque capabilities, the method 400 proceeds to step 460 in which the electronic control system 170 provides the torque request as the torque command to drive the inverter module 130. Generally, in this situation, the torque command is such that the electric drive system 110 can deliver the torque request over an extended period time, such as the life span of the vehicle 100.

However, if the absolute value of the torque request is equal to or greater than the absolute value of the long term torque capabilities, the method 400 proceeds to step 445. In step 445, the electronic control system 170 evaluates the impact of the torque request based on the short term capabilities. As noted above, the electronic control system 170 may modify operation of the electric drive system 110 and/or provide additional monitoring to attempt to accommodate the torque request without adversely impacting any components.

In steps 450 and 455, the electronic control system 170 compares the torque request to the short term torque capabilities. If the absolute value of the torque request does not exceed the absolute value of the short term torque capabilities, the method 400 proceeds to step 460 in which the electronic control system 170 provides the torque request as the torque command to drive the inverter module 130. If the absolute value of the torque request is does exceed the absolute value of the short term torque capabilities, the method 400 proceeds to step 465 in which the electronic control system 170 provides the short term torque capabilities as the torque command to drive the inverter module 130. As such, in some cases, the method uses short term torque capabilities to limit the torque command instead of long term torque capabilities. This provides increased performance, particularly with respect to speed and power.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an electric motor, comprising the steps of:
   receiving a torque request in an electronic control system;
   determining, in the electronic control system, long term torque capabilities and short term torque capabilities of the electric motor;
   generating, in the electronic control system, a torque command based on the torque request and at least one of the long term torque capabilities or the short term torque capabilities;

controlling the electric motor in accordance with the torque command; and calculating temperature reduction factors, wherein the determining step includes selecting nominal short term torque capabilities and limiting the nominal short term torque capabilities based on the temperature reduction factors, and wherein the determining step includes selecting nominal long term torque capabilities and limiting the nominal long term torque capabilities based on the temperature reduction factors.

2. The method of claim 1, wherein the controlling step includes controlling the electric motor with an inverter module, and wherein the calculating step includes calculating the temperature reduction factors based on temperature operating characteristics at the electric motor and the inverter module.

3. The method of claim 1, further comprising calculating cooling system reduction factors.

4. The method of claim 3, wherein the controlling step includes controlling the electric motor with an inverter module, the method further comprises cooling the electric motor and the inverter module with a cooling system, and wherein the calculating step includes calculating the cooling system reduction factors based on operating characteristics of the cooling system at the electric motor and the inverter module.

5. The method of claim 4, wherein the determining step includes selecting nominal short term torque capabilities and additionally limiting the nominal short term capabilities based on the cooling system reduction factors.

6. The method of claim 1, wherein the method further comprises calculating cooling system reduction factors, and wherein the determining step includes additionally limiting the nominal long term capabilities based on the cooling system reduction factors.

7. The method of claim 1, further comprising selecting a first operating mode or a second operating mode, and wherein, in the first operating mode, the generating step includes generating the torque command based on the torque request and the long term torque capabilities, and wherein, in the second operating mode, the generating step includes generating the torque command based on the torque request and the short term torque capabilities.

8. The method of claim 1, wherein the generating step includes comparing the torque request to the at least one of the long term torque capabilities or the short term torque capabilities; and setting the torque command approximately equal to the at least one of the long term capabilities or the short term torque capabilities when the torque request is greater than the at least one of the long term torque capabilities or the short term torque capabilities.

9. An electronic control system configured to operate an electric motor, comprising:

a torque controller configured to determine long term torque capabilities and short term torque capabilities associated with the electric motor;

a vehicle controller coupled to the torque controller and configured to receive a torque request and to generate a torque command based on the torque request and at least one of the long term torque capabilities or the short term torque capabilities; and an inverter module coupled to the vehicle controller and configured to receive the torque command and to drive the electric motor according to the torque command, wherein the short term torque capabilities received by the vehicle controller are modified short term torque capabilities and the long term torque capabilities received by the vehicle controller are modified long term torque capabilities, and wherein the torque controller is configured to select nominal short term torque capabilities and nominal long term torque capabilities, calculate at least one of temperature reduction factors or cooling system reduction factors, and limit the nominal short term torque capabilities and the nominal long term torque capabilities based on the at least one of temperature reduction factors or cooling system reduction factors to produce the modified short term torque capabilities and the modified long term torque capabilities.

10. The electronic control system of claim 9, wherein the torque controller is configured to calculate the temperature reduction factors.

11. The electronic control system of claim 10, wherein the torque controller is further configured to calculate the temperature reduction factors based on temperature operating characteristics of the electric motor and the inverter module.

12. The electronic control system of claim 10, wherein the torque controller is configured to select the nominal short term torque capabilities and limit the nominal short term capabilities based on the temperature reduction factors to produce the modified short term torque capabilities.

13. The electronic control system of claim 9, wherein the vehicle controller is configured to calculate the cooling system reduction factors.

14. The electronic control system of claim 13, wherein the torque controller is further configured to calculate the cooling system reduction factors based on cooling system operating characteristics of the electric motor and the inverter module.

15. The electronic control system of claim 14, wherein the torque controller is configured to select the nominal short term torque capabilities and limit the nominal short term capabilities based on the cooling system reduction factors to produce the modified short term torque capabilities.

16. The electronic control system of claim 9, wherein the vehicle controller is configured to operate in a first operating mode or a second operating mode, and wherein the vehicle controller, in the first operating mode, is configured to generate the torque command based on the torque request and the long term torque capabilities, and wherein the vehicle controller, in the second operating mode, is configured to generate the torque command based on the torque request and the short term torque capabilities.

17. The method of claim 1, wherein the determining step includes limiting the nominal short term torque capabilities and the nominal long term torque capabilities by separately applying the temperature reduction factors to the nominal short term torque capabilities and the nominal long term torque capabilities to produce modified short term torque capabilities and modified long term torque capabilities.

18. The method of claim 1, further comprising the steps of providing the modified short term torque capabilities and the modified long term torque capabilities to a vehicle controller;

providing the temperature reduction factors to the vehicle controller; and generating, in the vehicle controller, a torque command based on the modified short term torque capabilities, the modified long term torque capabilities, and the temperature reduction factors.

19. The method of claim 1, further comprising the steps of providing the modified short term torque capabilities and the modified long term torque capabilities to a vehicle controller;

generating, in the vehicle controller, a torque command based on the modified short term torque capabilities and the modified long term torque capabilities; and generating, in the vehicle controller; a shifting command for a transmission based on the modified short term torque capabilities and the modified long term torque capabilities.

* * * * *